(12) United States Patent
Hammer et al.

(10) Patent No.: US 8,061,345 B2
(45) Date of Patent: Nov. 22, 2011

(54) METHOD FOR WIRE SAWING

(75) Inventors: Ralf Hammer, Freiberg (DE); Ralf Gruzsynsky, Brand-Erbisdorf (DE)

(73) Assignee: Freiberger Compound Materials GmbH, Freiberg (DE)

( * ) Notice: Subject to any disclaimer, the term of this patent is extended or adjusted under 35 U.S.C. 154(b) by 393 days.

(21) Appl. No.: 11/344,540

(22) Filed: Feb. 1, 2006

(65) Prior Publication Data

US 2006/0243265 A1 Nov. 2, 2006

Related U.S. Application Data

(60) Provisional application No. 60/649,830, filed on Feb. 2, 2005.

(51) Int. Cl.
*B28D 1/08* (2006.01)
(52) U.S. Cl. .................... 125/21; 125/16.02
(58) Field of Classification Search .......... 125/21, 125/6.01, 16.02; 83/13, 74; 451/296
See application file for complete search history.

(56) References Cited

U.S. PATENT DOCUMENTS

| | | | |
|---|---|---|---|
| 3,032,026 A | 5/1962 | Raabe | |
| 4,105,012 A | 8/1978 | Hini et al. | |
| 4,160,439 A * | 7/1979 | Piat | 125/16.01 |
| 4,281,827 A | 8/1981 | Horwath | |
| 4,766,875 A * | 8/1988 | Feigelson | 125/21 |
| 5,052,366 A * | 10/1991 | Matsukura | 125/16.01 |
| 5,201,305 A * | 4/1993 | Takeuchi | 125/21 |
| 5,269,285 A | 12/1993 | Toyama et al. | |
| 5,720,271 A | 2/1998 | Hauser | |
| 5,735,258 A | 4/1998 | Okuno et al. | |
| 5,771,876 A * | 6/1998 | Egglhuber | 125/21 |
| 5,778,869 A * | 7/1998 | Toyama | 125/16.02 |
| 5,842,462 A * | 12/1998 | Schmid et al. | 125/16.02 |
| 5,875,770 A * | 3/1999 | Fukunaga | 125/16.02 |
| 5,893,308 A * | 4/1999 | Katamachi et al. | 83/13 |

(Continued)

FOREIGN PATENT DOCUMENTS

EP 0 903 210 A1 3/1999

(Continued)

OTHER PUBLICATIONS

R. Hammer et al., U.S. PTO Office Action, U.S. Appl. No. 12/269,738, dated May 27, 2009, 8 pgs.

(Continued)

*Primary Examiner* — Timothy V Eley
(74) *Attorney, Agent, or Firm* — Foley & Lardner LLP

(57) ABSTRACT

A method and a device for cutting a workpiece (1, 21) in a wire saw is described, wherein a workpiece (1, 21) is fixed in a wire saw by means of a mounting beam (2, 22). In the method according to the invention, the generation of a mark or a step on the cutting area along the cutting slit at the transition from the workpiece to the mounting beam (2, 22) is moved further to the edge of the cutting area or is avoided entirely. Therefore, the workpiece (1, 21) is held during the cutting operation in the wire saw by a mounting beam (2, 22) such that while one of the two piercing points (9; 29) lies on the surface of the workpiece (1, 21) and while simultaneously the other (10; 30) of the two piercing points (9, 10; 29, 30) lies on the surface of the mounting beam (2; 22), the piercing point lying on the surface of the workpiece is the entry side piercing point.

13 Claims, 6 Drawing Sheets

U.S. PATENT DOCUMENTS

| | | | |
|---|---|---|---|
| 5,913,305 A * | 6/1999 | Hauser | 125/16.02 |
| 6,035,845 A | 3/2000 | Kaser | |
| 6,062,209 A | 5/2000 | Oishi | |
| 6,067,976 A * | 5/2000 | Katayama et al. | 125/21 |
| 6,135,102 A | 10/2000 | Sorimachi et al. | |
| 6,145,422 A * | 11/2000 | Katamachi et al. | 83/74 |
| 6,371,101 B1 * | 4/2002 | Hauser | 125/16.01 |
| 6,511,571 B2 * | 1/2003 | McCallion et al. | 156/250 |
| 6,543,434 B2 * | 4/2003 | Holzmuller et al. | 125/21 |
| 6,568,384 B1 * | 5/2003 | Onizaki | 125/16.02 |
| 6,596,079 B1 * | 7/2003 | Vaudo et al. | 117/97 |
| 6,886,550 B2 * | 5/2005 | Hauser | 125/21 |
| 6,981,495 B2 | 1/2006 | Muller et al. | |
| 7,025,665 B2 * | 4/2006 | Bender | 451/296 |
| 2003/0145707 A1 | 8/2003 | Hauser | |
| 2004/0194773 A1 | 10/2004 | Muller et al. | |
| 2004/0226421 A1 | 11/2004 | Kelley | |
| 2005/0172769 A1 * | 8/2005 | Maes | 83/54 |
| 2006/0157299 A1 | 7/2006 | Garrett | |
| 2009/0320658 A1 | 12/2009 | Yazawa et al. | |

FOREIGN PATENT DOCUMENTS

| | | |
|---|---|---|
| JP | 57-075765 A | 5/1982 |
| JP | 05-096461 A | 4/1993 |
| JP | 07-205141 A | 8/1995 |
| JP | 09-085736 A | 3/1997 |
| JP | 10-264143 A | 10/1998 |
| JP | 11-188602 A | 7/1999 |
| JP | 11-262917 A | 9/1999 |
| JP | 2002-166416 A | 6/2002 |
| JP | 2004-082282 A | 3/2004 |
| JP | 2004-306250 A | 11/2004 |

OTHER PUBLICATIONS

R. Hammer et al., U.S. PTO Office Action, U.S. Appl. No. 12/269,738, dated Feb. 22, 2010, 9 pgs.

R. Hammer et al., U.S. PTO Office Action, U.S. Appl. No. 12/269,738, dated Aug. 4, 2010, 12 pages.

R. Hammer et al., U.S. PTO Office Action, U.S. Appl. No. 12/269,738, dated Mar. 8, 2011, 9 pages.

R. Hammer et al., U.S. PTO Office Action, U.S. Appl. No. 12/269,738, dated Sep. 14, 2011, 8 pages.

* cited by examiner

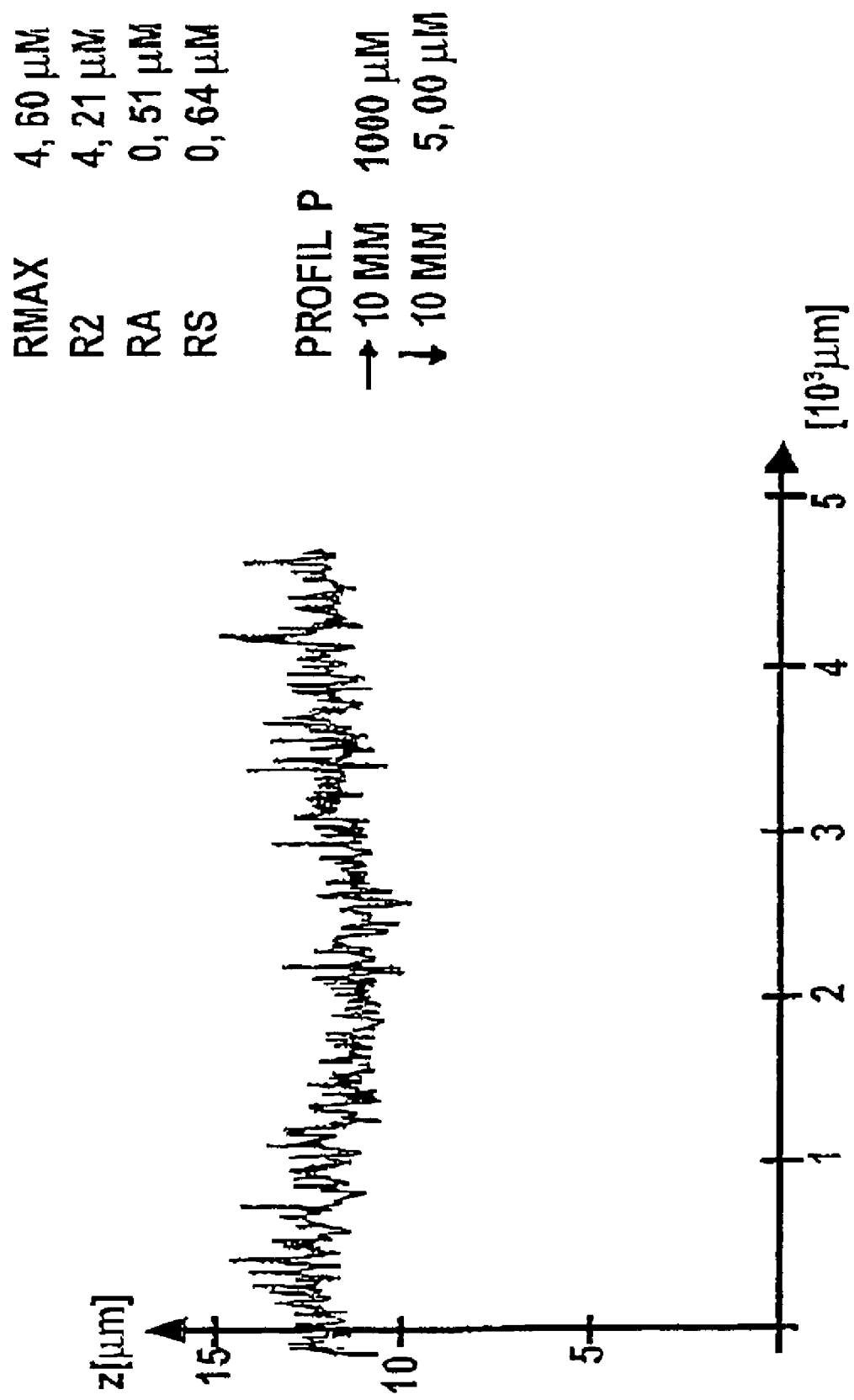

METHOD FOR WIRE SAWING

The invention relates to a method for cutting a workpiece, especially a single crystal, in a wire saw, as well as to a wire saw, to a mounting beam for performing that method and to a semiconductor wafer.

From EP 0 903 210 A1 it is known that undesirable marks (sawing marks) may occur on wafers in a generally known method of cutting wafers from a crystal by a wire saw in which the crystal is mounted by a mounting beam.

It is described in EP 0 903 210 A1 that the marks are generated when the sawing wire penetrates into the mounting beam. Further, it is known from this document that the material of the mounting beam has an influence on the depth of the mark. To avoid generation of marks, it is proposed in this document to use a material having the same hardness as that of the crystal for the mounting beam. However, this has the drawback that different mounting beams have to be kept ready for workpieces of different materials. Moreover, the possibility of optimization according to other criteria such as the coefficient of elasticity, the coefficient of thermal expansion, the stability, the adhesion, the machinability and others does not apply because of the restriction to materials of a certain hardness. Furthermore, also the wear of the wire and the consumption of slurry increase for cutting of a very hard workpiece by the use of a mounting beam of a very hard material.

FIGS. 5a and 5b each show the surface profile of a GaAs wafer after cutting of a GaAs single crystal by a known method of wire sawing as taken by a contact stylus instrument (Mahr Perthometer) along the scanning line 44 in FIG. 3. With 7 µm in FIG. 5a and 10 µm in FIG. 5b the depth of the mark or the height of the step (sawing mark) stands out significantly from the remaining surface roughness. For an adversarial choice of properties of the slurry, the height of the step may even become a higher value of more than 20 µm.

It is known to the applicant that the properties of the slurry such as the content of hard material or the viscosity of the carrier material have an influence on the generation of marks. The generation of marks may be minimized by appropriate choice of the slurry. On the other hand, the properties of the slurry have also an influence on other surface parameters of the wafers such as the warp, the bow or the surface roughness. In the known wire sawing method, it is not always possible to choose the properties of the slurry such that the generation of marks or steps and the aforementioned other surface parameters are optimized at the same time, because in part different properties are required for these two optimization criteria. With optimization of the slurry for avoiding generation of marks and steps and with simultaneous optimization of surface parameters, the operational range of the slurry properties is significantly restricted and the life time of the slurry is limited.

During wire sawing the slurry is kept in a closed loop in the majority of cases. Valuable gallium can be recovered from the slurry when wire sawing GaAs wafers. Therefore, because of economic reasons, the slurry is preferably kept in a closed loop until it has a high content of GaAs (about 10%). However, a high content of GaAs has a negative influence on the generation of marks and steps at the transition of the wire from the workpiece into the mounting beam.

After cutting the workpiece, further surface treatment steps (e.g. lapping, grinding, polishing) may follow depending on the requirements for the surface quality. These processes are inter alia necessary to correct defects in wire sawing such as the aforementioned marks or steps at the transition from the workpiece into the mounting beam. However, steps having a height of above 20 µm can also not be removed entirely by this method. Further, these methods cost time and money.

From U.S. Pat. No. 5,052,366 a method and a machine for wire sawing is known wherein the wire plane rocks relative to the mounting beam during the cutting process, the direction of the wire (direction of the longitudinal axis) being periodically varied relative to the feed direction. Simultaneously, the wire is reciprocated with an alternating sense of direction. Due to the variation of the direction of the wire during the rocking movement, the wire penetrates into the mounting beam already in an early phase of the cutting operation.

It is the object of the present invention to provide a method for cutting a workpiece in a wire saw wherein the cutting areas are as smooth as possible and show no mark. Furthermore, it is the object of the invention to provide a wire saw and a mounting beam by which the method for cutting a workpiece in a wire saw according to the invention may be performed.

The object is solved by a mounting beam for fixing a workpiece in a wire saw, by a method for cutting a workpiece in a wire saw, by a wire saw and by a wafer, according to the claims of the present invention.

Further developments of the invention are characterized in the sub-claims.

The method according to the invention and the devices according to the invention provide the advantage that, on the cutting area of a workpiece cut in a wire saw, the generation of marks or steps at the transition of the wire from the workpiece into the mounting beam can be either reduced or totally avoided.

Therefore, the property parameters of the slurry may be optimized with another objective as avoiding the generation of marks or steps. The slurry may e.g. be optimized to minimize surface parameters of the cutting area like warp, bow or surface roughness. Furthermore, the GaAs content of the slurry in the closed loop may be increased in the manufacture of GaAs wafers.

Further, the invention provides the advantage that a costly postprocessing of the cutting area by lapping or grinding can be omitted.

Furthermore, the yield may be increased in cutting a workpiece in a wire saw wherein high standards have to be met for the quality of the cutting area.

Furthermore, the edge region 42 (see FIG. 3) which can not be used for the manufacture of semiconductor devices—the so-called edge exclusion—may be minimized in the manufacture of semiconductor wafers 43. If the edge region wherein the marks are located is removed by edge rounding after cutting in the manufacture of wafers, the removal by edge rounding may be minimized and valuable material may be saved by the invention.

Further features and advantages of the invention may be derived from the description of embodiments accompanied by the Figures.

In the Figures:

FIG. 4 is the sectional view through a surface profile of a cutting area produced by a method according to the invention in a wire saw.

FIRST EMBODIMENT

Figure 1:
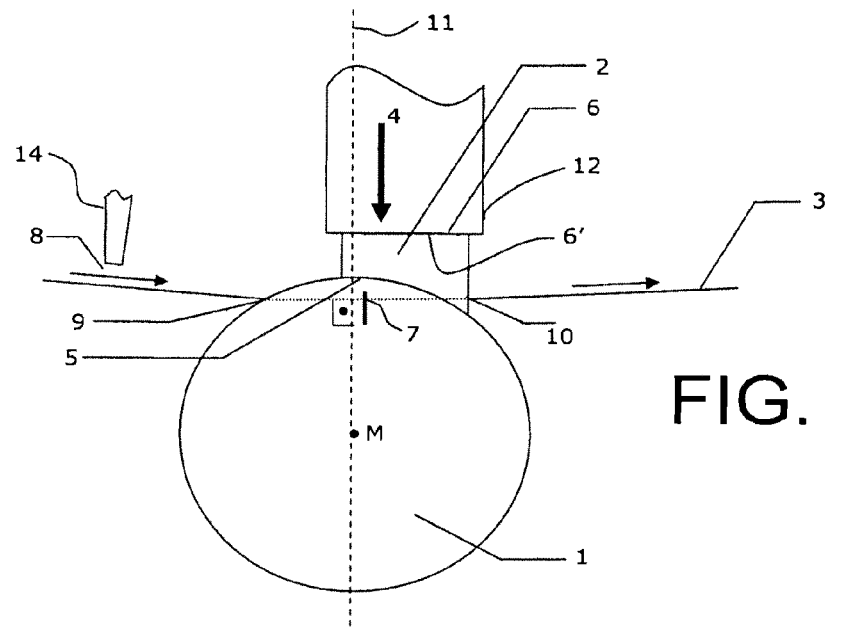
FIG. 1 is a schematic sectional view of a workpiece with a mounting beam attached thereto during the cutting operation in a wire saw according to a first embodiment.
Figure 2:
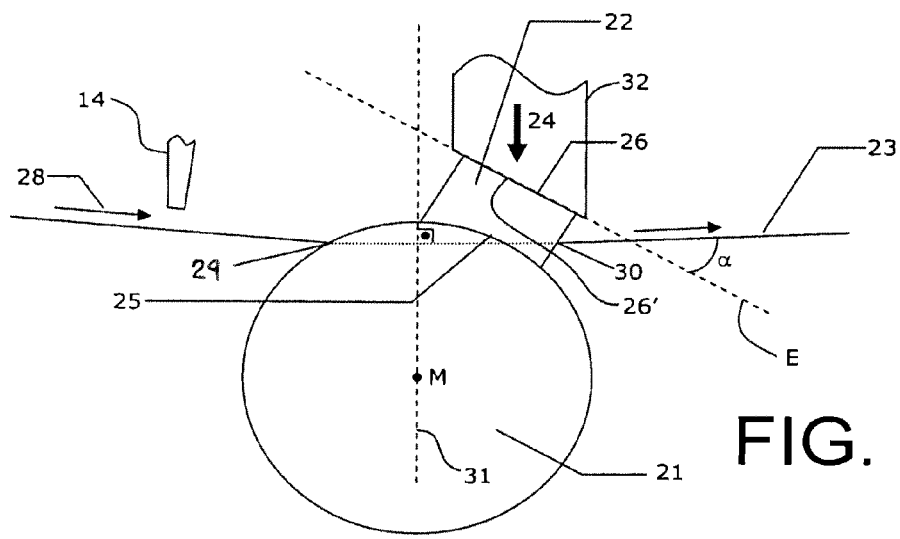
FIG. 2 is a schematic sectional view of a workpiece with a mounting beam attached thereto during the cutting operation in a wire saw according to a second embodiment.

In FIG. 1, a schematic sectional view of a workpiece with a mounting beam 2 is shown during the cutting operation in a wire saw according to the first embodiment.

The workpiece 1 is in the shape of a cylinder. The material may be a single crystal, especially a semiconductor single crystal such as a Si single crystal or a GaAs single crystal, but also any other material which can be cut by a wire saw. A mounting beam 2 by which the workpiece 1 is fixed in a wire saw is attached on the workpiece 1. The mounting beam may be e.g. of graphite but may be also of any other material which can be cut by a wire saw. In the wire saw, a wire 3 is stretched around rollers (not shown) such that a plurality of wire sections span a wire plane perpendicular to the drawing plane of FIG. 1. The wire saw has a feed device 12 to which the workpiece is attached by means of the mounting beam for cutting. The workpiece 1 can be moved relative to the wire plane in a feed direction 4 which is perpendicular to the wire plane by the feed device 12. A device 14 for applying slurry onto the wire is provided in the wire saw. Furthermore, a drive unit (not shown) for moving the wire 3 along its longitudinal direction is provided.

Figure 1A:
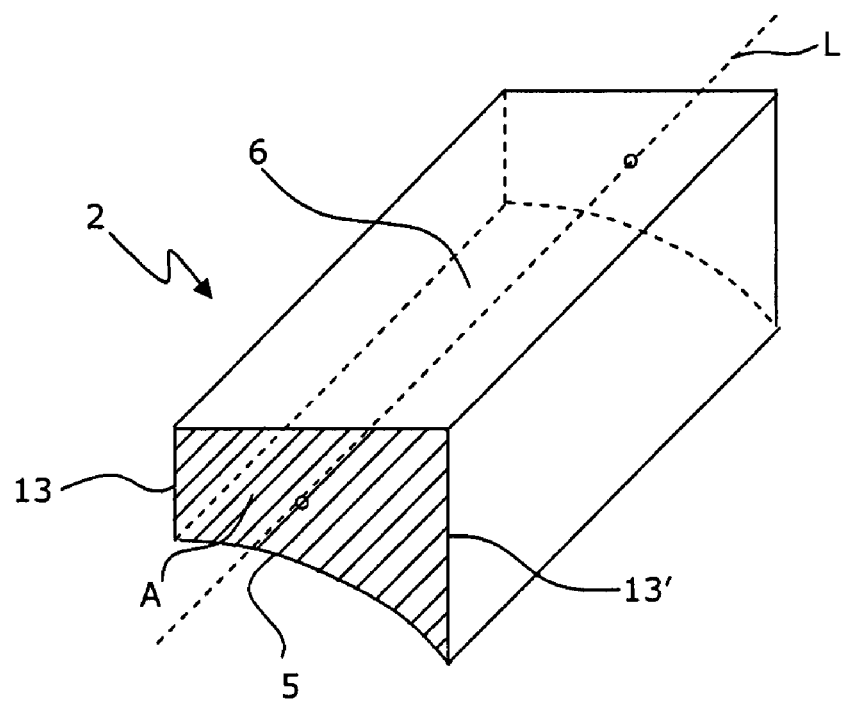
FIG. 1a is a perspective view of the mounting beam according to the first embodiment.

The mounting beam 2 according to the first embodiment is essentially formed as a longish cuboid which has a recess being adapted to the outer form of the cylindrical workpiece. By the recess, a bearing surface 5 of the mounting beam is formed, which serves as a contact surface for the workpiece 1 when the bearing surface is bonded onto the workpiece 1. In the first embodiment, the recess is formed such that the cross sectional area A (shaded area in FIG. 1a) of the mounting beam 2 perpendicular to its longitudinal axis L is asymmetric. A flat side surface 6 of the mounting beam 2 serves as a limit stop for attachment of the mounting beam 2 to the feed device 12. In a mounted state, this flat side surface 6 is aligned parallel to the wire plane (perpendicular to the drawing plane of FIG. 1). When viewed in cross section, the two sides 13, 13' which connect the flat side surface 6 with the contact surface 5 have different lengths. Due to its asymmetry, the mounting beam 2 is bonded onto the workpiece laterally displaced relative to a plane 11 which includes the longitudinal center axis M of the workpiece 1 and which is perpendicular to the wire 3 when it is mounted into the wire saw. Here, the longitudinal center axis M in FIG. 1 is perpendicular to the drawing plane.

In operation, the mounting beam 2 is attached to the workpiece 1 before the cutting. To fix the mounting beam onto the workpiece, it may be e.g. bonded onto the workpiece 1. E.g. an epoxy resin may be used as an adhesive therefor. By fixing of the mounting beam 2 to the feed device 12 the workpiece 1 is fixed in the wire saw. Therefore, the feed device 12 is provided with a limit stop face 6' which is parallel to the wire plane. The wire sections 3 are always moved with the same sense of direction 8 along their longitudinal axes while the workpiece 1 is pressed in a direction perpendicular to the wire plane onto the wire sections 3 and moved through the wire plane. Thereby the workpiece 1 is cut into a plurality of wafers.

The workpiece 1 and the mounting beam 2 form a continuous body, the surface of which is pierced by each of the wire sections 3 forming the wire plane at two piercing points 9 and 10 during the cutting operation. At the one piercing point 9 the wire enters the cutting slit with constant sense of direction 8 along its longitudinal direction, while it exits the cutting slit at the other piercing point 10. It turns out that the mark along the cut is formed at that position where the piercing point 9 on the entry side moves from the surface of the workpiece 1 onto the surface of the mounting beam 2. By laterally displacing the mounting beam relative to the plane 11 which includes the longitudinal center axis M of the workpiece 1 and which is perpendicular to the wire 3 it is achieved that the wire penetrates into the mounting beam on the entry side only shortly before or after the workpiece is completely cut through. Thereby the mark can be shifted towards the edge of the cutting area or even into the mounting beam.

In the first embodiment it is ensured that in the cutting operation, while one of the two piercing points (9; 29) is on the surface of the workpiece and simultaneously the other (10; 30) of the two piercing points is on the surface of the mounting beam (2; 22), the piercing point lying on the surface of the workpiece is the piercing point on the entry side.

The effect of the method according to the invention can be attributed to the fact that the slurry applied on the wire on the entry side can be transported into the cutting slit in the workpiece 1 without interference of the mounting beam 2 as long as the piercing point 9 on the entry side is on the surface of the workpiece.

SECOND EMBODIMENT

With the wire saw according to the second embodiment of the invention a mounting beam 22 known as such the cross sectional area of which perpendicular to the longitudinal axis L is symmetric may be used to perform the method according to the invention. A wire saw according to the second embodiment differs from the wire saw according to the first embodiment in that the mounting beam 22 is held in the wire saw in an inclined manner relative to a plane perpendicular to the wire plane. For that purpose, the feed device 32 is provided with a limit stop face 26' for the mounting beam 22 which is inclined such that the plane E defined by the limit stop face 26' encloses with the wire plane an angle α.

The mounting beam 22 bears with its bearing face 25 on the workpiece. A side surface 26 of the mounting beam 22 facing the bearing face 25 provides a limit stop for attachment of the mounting beam 22 to the limit stop face 26' of the feed device 32. In a mounted state, the flat side surface 26 is parallel to the limit stop face 26' of the feed device 32, while the bearing face 25 provides a contact surface between workpiece 21 and mounting beam 22. Since the limit stop face 26' of the feed device 32 is rotated around the longitudinal center axis M by an angle a relative to the wire plane, the mounting beam 22 is bonded onto the workpiece laterally displaced relative to a plane which includes the longitudinal center axis M of the workpiece 21 and which is perpendicular to the wire 23 when it is mounted into the wire saw.

With the wire saw according to a second embodiment and a mounting beam 22 known as such, the method according to the invention can be performed wherein the body composed of the workpiece 21 and the mounting beam 22 is moved through the wire plane such that at least temporary one piercing point through which the wire section 23 penetrates the composed body lies on the surface of the workpiece 21, while simultaneously the other piercing point 30 through which the wire section 23 penetrates the composed body lies on the surface of the mounting beam 22.

Thereby, as in the first embodiment, it is achieved that the contact surface 25 between the mounting beam 22 and the workpiece 21 in a mounted state is only or at least predominantly on one side of the plane 31 which is spanned by the longitudinal center axis M of the workpiece 21 and a perpendicular on the section of the wire 23 through which the workpiece 21 is moved.

Herein, the mounting beam 22 is preferably oriented in the wire saw such that it is only on one side of the plane 31 which is spanned by the longitudinal center axis M of the workpiece 21 and a perpendicular on the section of the wire 23 through which the workpiece 21 is moved. Thereby at least one of the two piercing points 29 and 30 lies on the surface of the workpiece 21 throughout the entire process of cutting the workpiece 21.

The slurry applied on the wire 23 on the entry side can thus be transported into the cutting slit by the wire without interference by the mounting beam throughout the entire cutting process.

Also in the second embodiment, it is ensured that during the cutting process, while one of the two piercing points lies on the surface of the workpiece 21 and simultaneously the other of the two piercing points 29, 30 lies on the surface of the mounting beam 22, the piercing point lying on the surface of the workpiece is the entry side piercing point.

Figure 3:
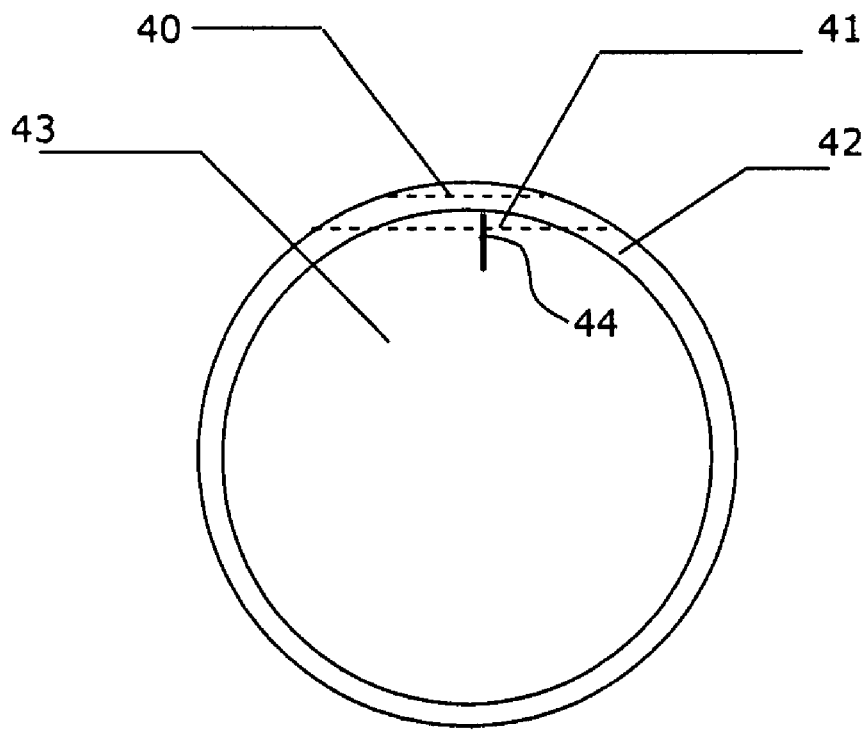
FIG. 3 shows the position of a mark on the surface of a semiconductor wafer.

In FIG. 3, the position of the mark 40 on a semiconductor wafer is shown which has been manufactured from a semiconductor single crystal as a workpiece by the method of the invention according to one of the two embodiments. For comparison, the position of the mark 41 is indicated which is formed in the known wire sawing of a semiconductor single crystal on the semiconductor wafer. The inner area 43 is that area of the semiconductor wafer which remains after subsequent rounding of the semiconductor wafers. By the method of the invention, the position of the mark can be shifted into this area which is removed in rounding of the wafer subsequent to cutting of the workpiece, or the generation of marks can be avoided at all.

Figure 5A:
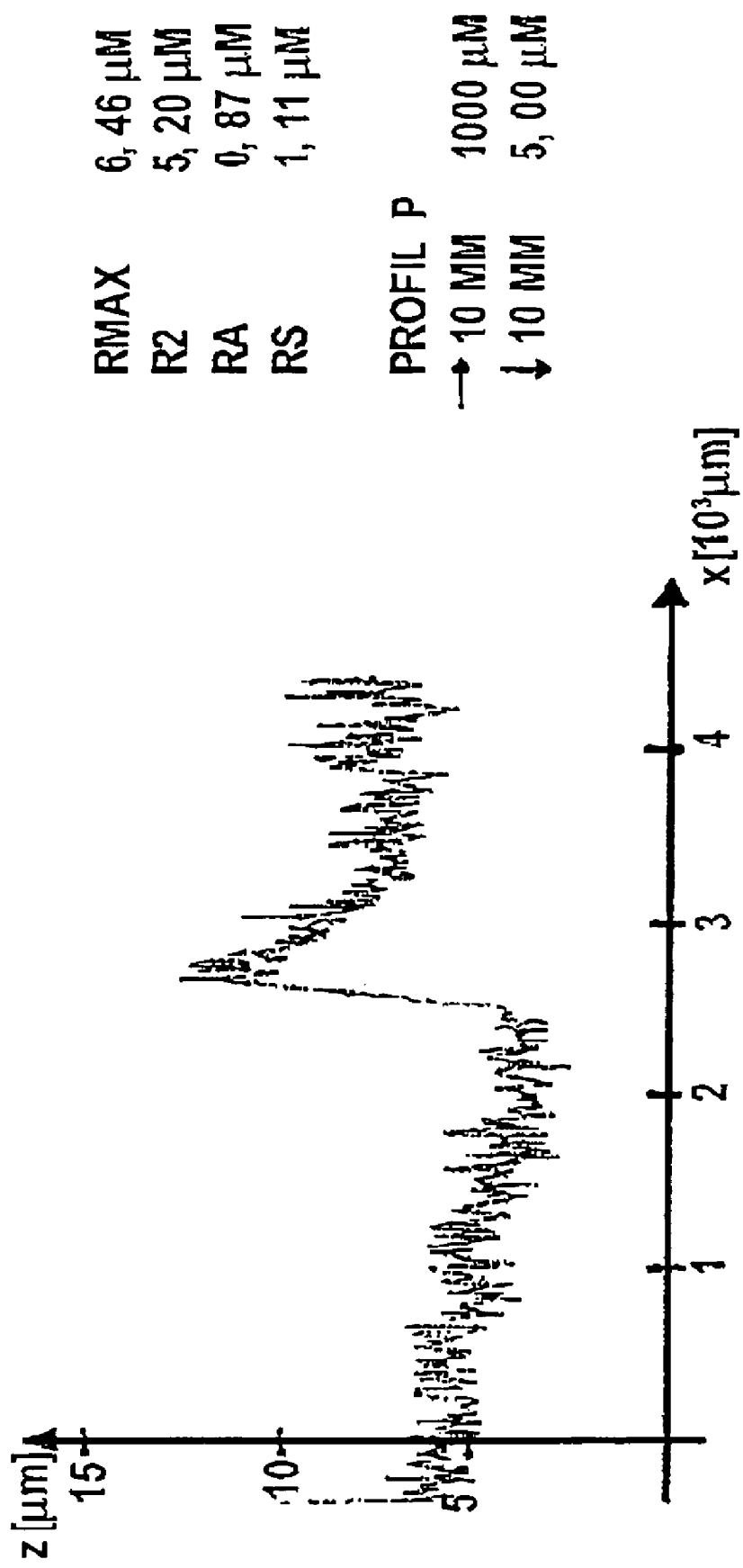
FIGS. 5a und 5b are each sectional views through a surface profile of a cutting area produced by a known method in a wire saw.
Figure 5B:
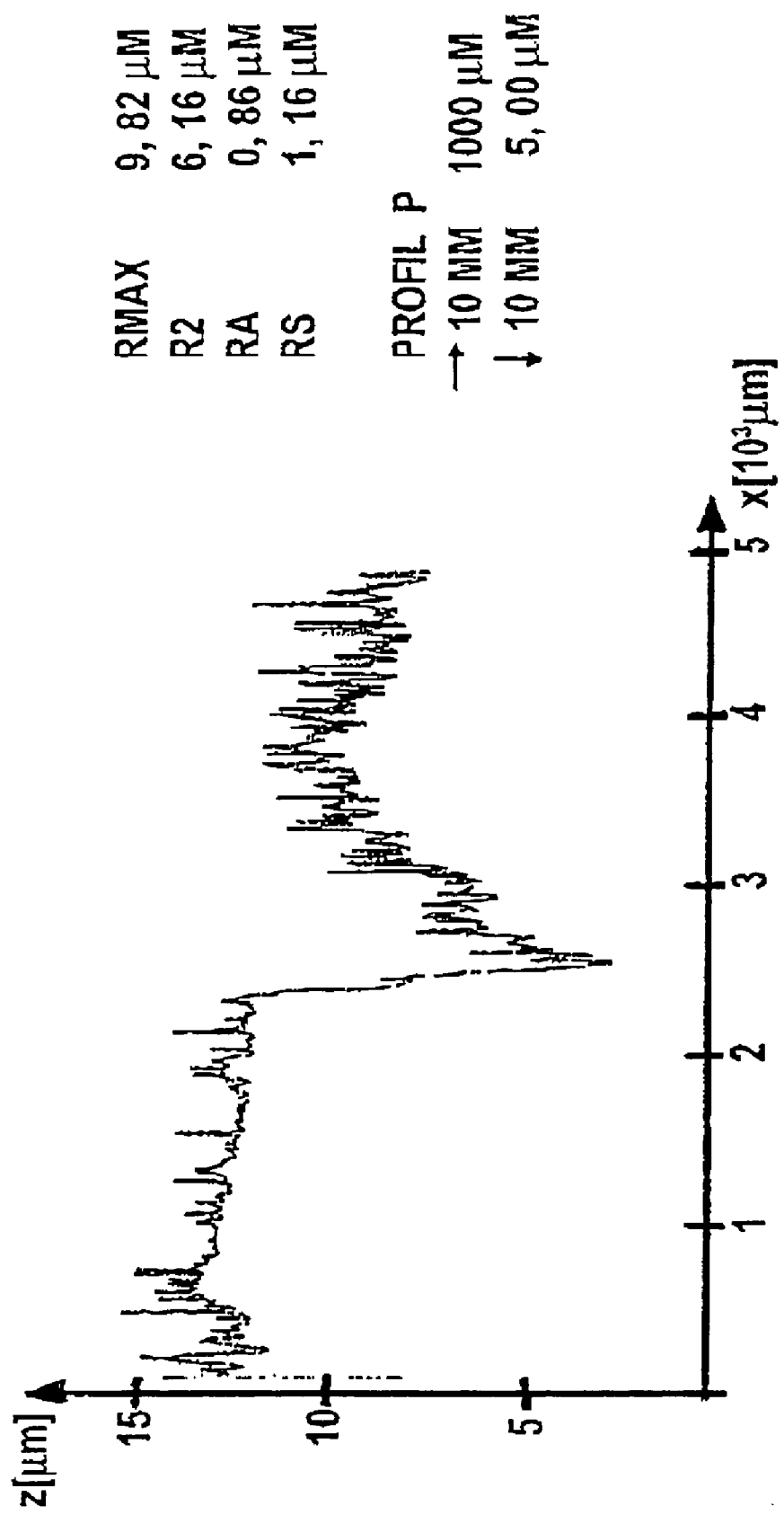

FIG. 4 shows a section through the surface profile of a GaAs wafer manufactured by the method according to the invention. The surface profile was therefor taken along the scanning line 7 in FIG. 1 by a contact stylus instrument (Mahr Perthometer). The improvement of the surface profile can be clearly seen when comparing with measurements of conventionally manufactured GaAs wafers in FIGS. 5*a* and 5*b*. No mark or step is visible here at the transition of the cut from the workpiece to the mounting beam. Therefore, by the method of the invention a wafer is manufactured which shows no marks in a state in which it is not rounded, i.e. without performing edge rounding subsequent to cutting in the wire saw. This wafer may be made of a polycrystalline or single crystalline material like GaAs or InP.

The invention was described such that either the mounting beam or the limit stop face for supporting the workpiece with a known mounting beam in the wire saw is provided such that the contact surface between the mounting beam and the workpiece in a mounted state is only or at least predominantly on one side of the plane which is spanned by the longitudinal center axis M of the workpiece and a perpendicular on that section of the wire through which the workpiece is moved. However, it is also possible to combine a mounting beam according to the first embodiment with a wire saw according to the second embodiment to achieve that.

The invention was described such that the workpiece has the shape of a cylinder. However, the shape of the workpiece is not limited to that. Accordingly, the cross sectional area of the workpiece may have any other shape.

The feed device was described in the embodiments of the invention such that it is perpendicular to the wire plane. However, the feed direction may be any other direction as long as it has a component perpendicular to the wire plane.

The direction of the longitudinal axis of the wire may vary relative to the mounting beam during the cutting process as long as the entry side piercing point of the wire is herein on the surface of the workpiece and does not move onto the surface of the mounting beam thereby. Accordingly, it is possible to perform the cutting operation first in a rocking mode and in a final phase without rocking with fixed orientation of the wire relative to the mounting beam. Another possibility is to coordinate the periodical rocking movement and the variation of the sense of direction of the movement of the wire along its longitudinal axis such that during that time during which one of the two piercing points lies on the workpiece and simultaneously the other piercing point lies on the mounting beam, the piercing point on the workpiece is always on the entry side.

The invention claimed is:

1. A method for cutting a workpiece in a wire saw, wherein the workpiece is attached to a mounting beam in such manner that the workpiece and the mounting beam form a continuous body, the method comprising:

moving the workpiece through a wire along a linear and constant feed direction to perform a cutting of the workpiece, wherein the wire penetrates a surface of the body at two opposing piercing points during cutting, wherein a section of the wire, relative to which the workpiece is moved to perform cutting, has a longitudinal axis that is oriented at a constant angle relative to the feed direction of the wire saw, wherein the constant angle is substantially 90°, moving the wire along its longitudinal axis such that one of the two piercing points is defined as an entry side piercing point and the other as an exit side piercing point, and when one of the two piercing points lies on a surface of the workpiece and at the same time the other of the two piercing points lies on a surface of the mounting beam, the piercing point lying on the workpiece is the entry side piercing point throughout an entire cutting process through the workpiece; and wherein the workpiece comprises at least one cylindrically shaped portion, the mounting beam having a longitudinal axis (L) and a cross sectional area (A) in a plane perpendicular to the longitudinal axis (L) that is asymmetric with respect to a mirror plane that includes a feed direction of the wire saw, and the mounting beam further comprising a bearing surface for the work piece which has a configuration that is adapted to the cylindrical shape of the work piece.

2. A method according to claim 1, wherein the wire is moved during cutting along its longitudinal axis in a constant direction.

3. A method according to claim 1, wherein a section of the wire, relative to which the workpiece is moved to perform cutting, has a longitudinal axis that is oriented at a constant angle relative to the mounting beam during the cutting.

4. A method according to claim 1, wherein a section of the wire, relative to which the workpiece is moved to perform cutting, has a longitudinal axis that is periodically varied relative to the mounting beam during the cutting.

5. The method according to claim 4, wherein simultaneously the direction of the movement of the wire along its longitudinal axis is periodically varied.

6. A method according to claim 1, wherein the entry side piercing point lies on the surface of the workpiece throughout the entire cutting through of the workpiece.

7. A method according to claim 1, wherein the workpiece comprises a semiconductor single crystal.

8. A method according to claim 1, wherein the workpiece is attached to the mounting beam by bonding.

9. A method according to claim 1, wherein the workpiece is held by the mounting beam in the wire saw such that a contact surface between the mounting beam and the workpiece ties predominantly on one side of a plane that contains a longitudinal center axis (M) of the workpiece and that is perpendicular to the longitudinal axis of a section of the wire, relative to which the workpiece is moved to perform cutting.

10. A method according to claim 1, wherein a center of the mounting beam is offset to a center of the workpiece relative to the plane perpendicular to a longitudinal axis (M) of the workpiece.

11. A method for cutting a workpiece in a wire saw, wherein the workpiece is attached to a mounting beam such that the workpiece and the mounting beam form a continuous body, the method comprising:

moving the workpiece through the wire along a linear and constant feed direction to perform a cutting of the workpiece, wherein the wire penetrates a surface of the body at two opposing piercing points during cutting, wherein a section of the wire, relative to which the workpiece is moved to perform cutting, has a longitudinal axis that is oriented at a constant angle relative to the feed direction of the wire saw, wherein the constant angle is substantially 90°, moving the wire along its longitudinal axis such that one of the two piercing points is defined as an entry side piercing point and the other as an exit side piercing point, when one of the two piercing points lies on a surface of the workpiece and at the same time the other of the two piercing points lies on a surface of the mounting beam, the piercing point lying on the workpiece is the entry side piercing point throughout an entire cutting process through the workpiece, and wherein the workpiece is held by the mounting beam in the wire saw in such a manner that a contact surface between the mounting beam and the workpiece in a mounted state lies predominantly on one side of a plane that contains a longitudinal axis (M) of the workpiece and that is perpendicular to the longitudinal axis of a section of the wire, relative to which the workpiece is moved to perform cutting.

12. A method according to claim 11, wherein a center of gravity of a transverse cross section of the mounting beam lies on one side of said plane.

13. A method according to claim 11, wherein a center of the mounting beam is offset to a center of the workpiece relative to the plane perpendicular to the longitudinal axis (M) of the workpiece.

* * * * *

UNITED STATES PATENT AND TRADEMARK OFFICE
CERTIFICATE OF CORRECTION

PATENT NO. : 8,061,345 B2
APPLICATION NO. : 11/344540
DATED : November 22, 2011
INVENTOR(S) : Hammer et al.

Page 1 of 1

It is certified that error appears in the above-identified patent and that said Letters Patent is hereby corrected as shown below:

ON THE FRONT OF PATENT

Insert

-- Related U.S. Application Data

(60) Continuation of application No. PCT/EP2004/014108, filed on Dec 10, 2004. --

Signed and Sealed this
Twenty-eighth Day of February, 2012

David J. Kappos
*Director of the United States Patent and Trademark Office*